United States Patent
Yoo et al.

(10) Patent No.: US 8,643,806 B2
(45) Date of Patent: Feb. 4, 2014

(54) LIQUID CRYSTAL DISPLAY DEVICE

(75) Inventors: Jun Mo Yoo, Yongin-si (KR); Seong Eun Chung, Seoul (KR); Il Yong Jung, Yongin-si (KR); Tae Bae Kim, Asan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 13/118,659

(22) Filed: May 31, 2011

(65) Prior Publication Data

US 2012/0050635 A1   Mar. 1, 2012

(30) Foreign Application Priority Data

Aug. 25, 2010  (KR) .................. 10-2010-0082326

(51) Int. Cl.
*G02F 1/1335* (2006.01)
*F21V 7/04* (2006.01)
*G09F 13/04* (2006.01)

(52) U.S. Cl.
USPC ............. 349/64; 349/62; 362/97.2; 362/97.3; 362/612; 362/621

(58) Field of Classification Search
USPC .............. 349/58, 62, 64; 362/612, 97.2–97.3, 362/621
See application file for complete search history.

(56) References Cited

U.S. PATENT DOCUMENTS

| 5,499,120 | A | * | 3/1996 | Hansen | 349/62 |
| 2009/0059130 | A1 | * | 3/2009 | Kim et al. | 349/65 |
| 2011/0007236 | A1 | * | 1/2011 | Kim et al. | 349/58 |

* cited by examiner

*Primary Examiner* — Nathanael R Briggs
(74) *Attorney, Agent, or Firm* — Sughrue Mion, PLLC

(57) ABSTRACT

A liquid crystal display device is provided. The liquid crystal display device includes a light-shielding member to prevent light irradiated upward from a light-emitting surface of a plurality of light-emitting diodes from being incident on a lower edge of an incident surface of a light-guide portion. As a result, a bezel surrounding a liquid crystal display panel may be made thinner, and a bright line defect, hot spot, may be prevented.

24 Claims, 6 Drawing Sheets

LIQUID CRYSTAL DISPLAY DEVICE

CROSS-REFERENCE TO RELATED APPLICATION(S)

This application claims priority from Korean Patent Application No. 2010-0082326, filed on Aug. 25, 2010 in the Korean Intellectual Property Office, the disclosure of which is incorporated herein by reference in its entirety.

BACKGROUND

1. Field

Apparatuses consistent with embodiments relate generally to a liquid crystal display device to reduce a bezel width and prevent generation of bright lines.

2. Description of the Related Art

A liquid crystal display (LCD) device displays an image using electrical and optical properties of liquid crystal. The liquid crystal display (LCD) device has advantages of small thickness, light-weight, low power consumption and low driving voltage and is thus widely utilized in the overall industry.

The liquid crystal display includes a liquid crystal display panel in which the orientation of liquid crystal molecules and thus light transmittance are changed by applying an electric voltage to liquid crystals sealed between two transparent substrates. The liquid crystal display then optically displays an image, and a backlight assembly is provided to provide light to the liquid crystal panel.

Recently, an edge-type backlight assembly using a light-emitting diode (LED) as a light source has been generally used to realize slimness of the liquid crystal display device.

The edge-type backlight assembly operates in a manner such that a light-emitting diode is mounted at a side surface of a backlight assembly, and light is directed to a front surface of the liquid crystal display through a light-guide portion, thus realizing slimness due to a decrease in overall thickness of the backlight assembly.

Such a liquid crystal display seeks the slimness and light-weight trends to secure competitiveness. In particular, technologies to reduce the width extending from the peripheral line of a display panel to an active area in which a screen is actually displayed (hereinafter, referred to as a "bezel width") and thereby decrease the peripheral size of image display devices are being developed.

This decrease in bezel width is advantageous in that concentration on the screen is improved and the screen appears larger.

However, the structure having the edge-type backlight assembly has a minimum optical distance necessary for light to be emitted from the light-emitting diode to the light-guide portion.

Accordingly, a minimal bezel width is required to cover these elements. For this reason, there is a limitation in reducing the bezel width to a predetermined distance or less.

SUMMARY

One or more exemplary embodiments provide a liquid crystal display device to reduce a bezel width and prevent unevenness (mura) of brightness caused by a hot-spot.

One or more exemplary embodiments also provide a liquid crystal display device including a liquid crystal display panel; a top chassis disposed behind a front surface of the liquid crystal display panel; a bottom chassis arranged on a rear surface of the liquid crystal display panel; at least one optical sheet arranged between the liquid crystal display panel and the bottom chassis; a light-guide portion arranged between the bottom chassis and the optical sheet, the light-guide portion having a light-emitting surface facing the liquid crystal display panel and an incident surface perpendicular to the light-emitting surface; a reflective portion arranged between the light-guide portion and the bottom chassis; a side frame provided with a side wall to surround an outside of the light-guide portion, an outside of the reflective portion and an outside of the bottom chassis, with the side frame having a support rib extending from the side wall to safely mount the liquid crystal display panel and the optical sheet; a printed circuit board arranged between the side frame and the bottom chassis, the printed circuit board provided with a plurality of light-emitting diodes; a reflective surface arranged in an inner surface of the side frame, the reflective surface directing light from the plurality of light-emitting diodes to the incident surface; a holder to support one surface of the printed circuit board and connect the side frame with the bottom chassis; and a light-shielding member preventing light irradiated from the plurality of light-emiting diodes from being incident to a lower edge of the incident surface.

The light-shielding member may be an extending portion protruding outward from an edge of the reflective portion.

The extending portion may have a length of about 0.5 millimeters (mm).

The extending portion may be curved to surround a side of the bottom chassis adjacent to the plurality of light-emitting diodes.

The liquid crystal display may further include: a pad providing close contact between the reflective portion and the light-guide portion, and providing close contact between the light-guide portion and the support rib.

The pad may be made of an elastic material.

The side frame may be made of a metal material.

The reflective surface may be curved with a predetermined curvature.

The side frame may be made of a resin material.

The top chassis may be provided with a bezel portion to support an edge of the liquid crystal display panel, and wherein the top chassis is provided with a side portion extending from an end of the bezel portion at a different angle, and wherein the side wall of the side frame may be provided at the outer surface thereof with a recessed surface to mount the side portion.

The holder may be made of a thermally conductive metal material.

The plurality of light-emitting diodes may be mounted in the printed circuit board such that a light-emitting surface to emit light is directed upward in a direction of the liquid crystal display panel, and wherein the light-emitting surface may be positioned below the reflective portion such that it is further from the liquid crystal display panel than the reflective portion.

The bottom chassis may be made of a thermally conductive material, the side frame may be provided at the inner surface thereof with a mounting groove and the bottom chassis may be provided at the edge thereof with an accepting groove, wherein one side of the printed circuit board is mounted in the mounting groove and another side thereof is accepted in the accepting groove.

The reflective surface may be spaced away from the incident surface and faces the incident surface.

In accordance with another exemplary embodiment, a liquid crystal display device includes: a liquid crystal display panel; a light-guide portion arranged under the liquid crystal display panel; a reflective portion arranged under the light-guide portion; a plurality of light-emitting diodes arranged on at least one side of the light-guide portion, the plurality of light-emitting diodes mounted on the printed circuit board such that a light-emitting surface on each of the plurality of light-emitting diodes directs light toward the liquid crystal display panel, wherein light emitted from the light-emitting surface is refracted on a reflective surface arranged on the light-emitting surface and is incident to an incident surface provided on the side of the light-guide portion; and a light-shielding member preventing light irradiated upward from the light-emitting surface of the light-emitting diodes from being incident to a lower edge of the incident surface of the light-guide portion.

The light-shielding member may be an extending portion protruding outward from an edge of the reflective portion.

The extending portion may have a length of about 0.5 millimeters (mm).

The liquid crystal display device may further include a side frame provided with a side wall constituting a side periphery of the liquid crystal display device, and wherein the side frame further comprises a support rib extending from the side wall to enable the liquid crystal display panel to be mounted thereon and to support the light-guide portion thereby, and wherein the side wall includes a reflective surface at an inner surface thereof.

The liquid crystal display device may further include: a rectangular bottom chassis arranged under the reflective portion, wherein the plurality of light-emitting diodes are arranged between a side wall and the side of the bottom chassis, and wherein the extending portion is curved to surround the side of the bottom chassis.

The liquid crystal display device may further include: a pad providing close contact between the support rib and the light-guide portion, and providing close contact between the light-guide portion and the reflective portion.

The pad may be made of an elastic material.

The light-emitting surface of the light-guide portion may be arranged below the reflective portion such that it is further from the liquid crystal display panel than the reflective portion.

The liquid crystal display device may further include: a holder supporting one surface of the printed circuit board and connecting the side frame with the bottom chassis, the holder being made of a thermally conductive metal material.

The liquid crystal display device may further include: a top chassis provided with a bezel portion to support an edge of the liquid crystal display panel, and wherein the top chassis is provided with a side portion connected with the side wall of the side frame, wherein the side wall includes a recessed external surface to enable the side portion to be mounted thereon.

In accordance with another exemplary embodiment, a liquid crystal display device includes: a liquid crystal display panel; a light-guide portion positioned below the liquid crystal display panel and including a light-emitting surface facing the liquid crystal display panel and an incident surface perpendicular to the light-emitting surface; a printed circuit board comprising a plurality of light-emitting diodes arranged on a periphery thereof; a side frame surrounding side surfaces of each of the liquid crystal display panel, light-guide portion and printed circuit board, the side frame including an inner wall surface reflecting light from the plurality of light-emitting diodes to the light-emitting surface; and a light-shielding member positioned between the plurality of light-emitting diodes and incident surface preventing light from directly irradiating from the plurality of light-emitting diodes to a lower edge of the incident surface.

In accordance with another exemplary embodiment, a liquid crystal display device includes: a liquid crystal display panel; a light-guide portion positioned below the liquid crystal display panel and including a light-emitting surface facing the liquid crystal display panel and an incident surface perpendicular to the light-emitting surface; a reflective portion positioned between the light-guide portion and a bottom chassis; a side frame surrounding side surfaces of each of the liquid crystal display panel, light-guide portion and reflective portion, the side frame including an inner wall surface and a support rib extending from the inner wall surface to provide support for mounting the liquid crystal display panel; a printed circuit board positioned between the side frame and the bottom chassis, the printed circuit board comprising a plurality of light-emitting diodes arranged on a periphery thereof; and a pad provided between the reflective portion and the bottom chassis, which urges the reflective portion toward the light-guide portion so the light-guide portion is urged against the support rib.

As apparent from the afore-going, the liquid crystal display device of the exemplary embodiments prevents unevenness (mura) in brightness of the display caused by hot-spots, and thus improves reliability, although reducing a bezel width.

BRIEF DESCRIPTION OF THE DRAWINGS

These and/or other aspects of the exemplary embodiments will become more apparent and more readily appreciated from the following description of the exemplary embodiments, taken in conjunction with the accompanying drawings of which.

DETAILED DESCRIPTION

Figure 1:
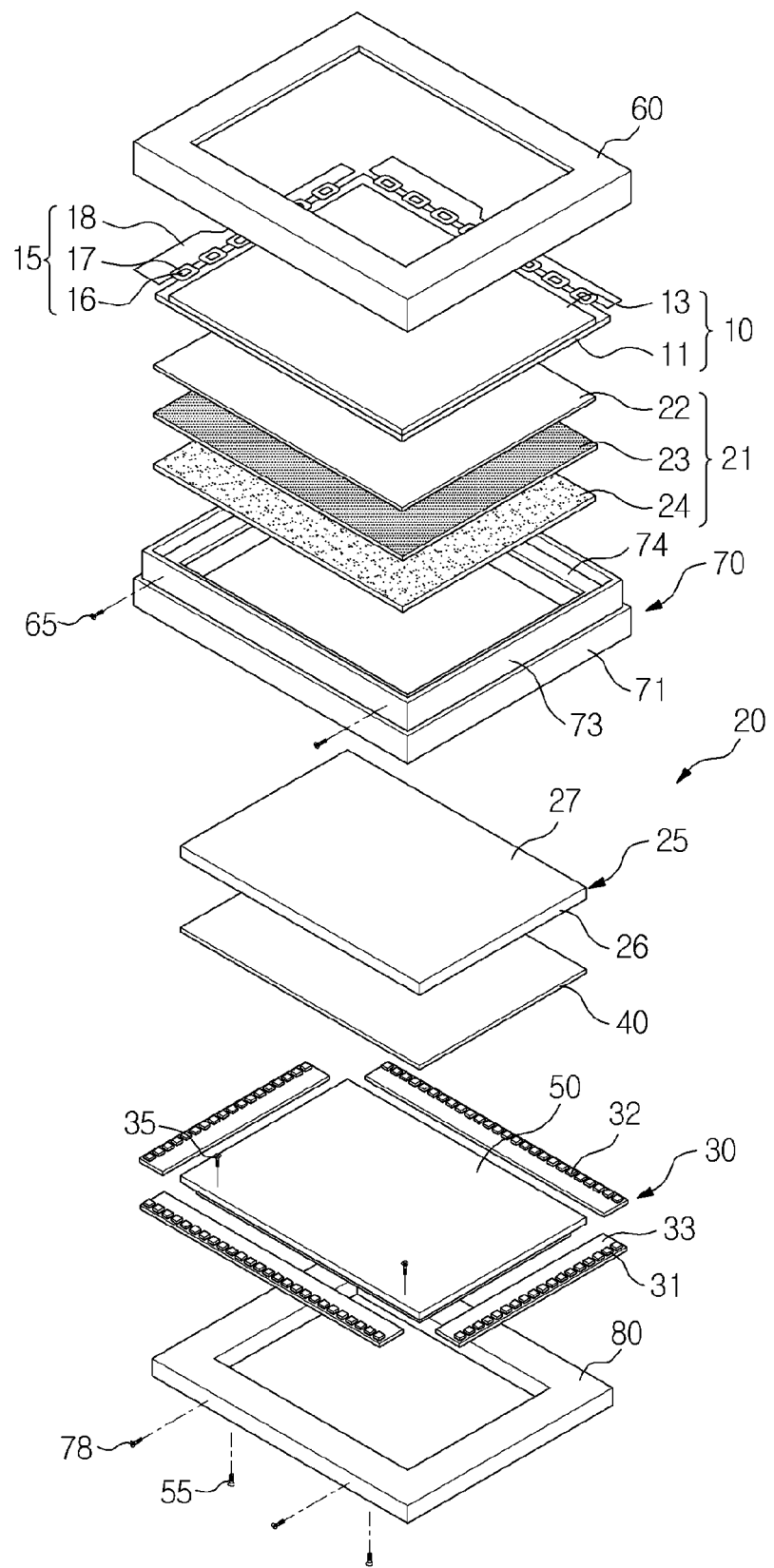
FIG. 1 is an exploded perspective view illustrating a liquid crystal display device, according to one exemplary embodiment.

Reference will now be made in detail to the exemplary embodiments, examples of which are illustrated in the accompanying drawings, wherein like reference numerals refer to the like elements throughout.

FIG. 1 is a perspective view illustrating a schematic structure of a liquid crystal display device according to one exemplary embodiment.

Referring to FIG. 1, the liquid crystal display device includes: a liquid crystal display panel 10; a backlight unit 20 positioned at the back of the liquid crystal display panel 10; a side frame 70 to support the liquid crystal display panel 10 and the backlight unit 20 such that the liquid crystal display panel 10 is spaced away from the backlight unit 20; and a top chassis 60 and a bottom chassis 50 positioned on the liquid crystal display panel 10 and under the backlight unit 20, respectively.

The liquid crystal display panel 10 further includes: a thin film transistor substrate 11 provided with a thin film transistor; a color filter substrate 13 facing the thin film transistor substrate 11; and a liquid crystal layer (not shown) positioned between the thin film transistor substrate 11 and the color filter substrate 13.

The thin film transistor substrate 11 is provided with a driving portion 15 at one side thereof to apply a driving signal.

The driving portion 15 includes a flexible printed circuit board (FPCB) 16, a driving chip 17 mounted on the flexible printed circuit board 16, and a circuit substrate 18 connected with an opposite side of the flexible printed circuit board 16.

The driving portion 15 may be a chip on film (COF). Alternatively, the driving portion 15 may be any known type such as a tape carrier package (TCP) or a chip on glass (COG). In addition, the driving portion 15 may be mounted on the thin film transistor substrate 11.

Such a liquid crystal display panel 10 controls orientation of liquid crystal layers to form a screen, but receives light from the backlight unit 20 positioned on the back of the panel, since it is non-light-emitting device.

The backlight unit 20 includes: a plurality of optical sheets 21 positioned under the liquid crystal display panel 10; a light-guide portion 25 positioned under the optical sheets 21; a light source unit 30 to supply light to the light-guide portion 25; and a reflective portion 40 positioned under the light-guide portion 25.

Each optical sheet 21 includes a protective film 22, a prism film 23 and a diffusion film 24.

A bead-shaped coating layer is formed on the base substrate of the diffusion film 24 to diffuse light from the light-guide portion 25 and supply the light to the liquid crystal display panel 10.

The prism film 23 includes a plurality of prisms arranged in a predetermined pattern to collect light perpendicularly diffused from the diffusion film 24 and focus the light to the surface of the liquid crystal display panel 10.

The prism film 23 is generally used in two sheets and micro-prisms formed on each prism film 23 form a predetermined angle.

Most light passing through the prism film 23 proceeds vertically and provides uniform brightness distribution.

The protective film 22 is positioned on the prism film 23 to protect the prism film 23. as the prism film 23 is sensitive to scratches from foreign materials such as dust.

The light-guide portion 25 is made of an acryl-based resin such as polymethylmethacrylate (PMMA) or polymethylstyrene (copolymer of methylmethacrylate and styrene) and uniformly supplies light from the light source unit 30 to the diffusion film 24.

The light-guide portion 25 includes an incident surface 26, on which light is incident from the light source unit 30. The incident surface 26 is provided at the of the light-guide portion 25. A light-emitting surface 27 faces the diffusion film 24, and a reflective surface (not shown) is positioned parallel to the light-emitting surface 27.

The light source unit 30 includes a plurality of light-emitting diodes (LEDs) 31 to emit light, and a printed circuit board 33 provided with the light-emitting diodes 31 to apply an electrical signal to the light-emitting diodes 31.

The light-emitting diodes 31 may be provided as a plurality of light-emitting diodes to emit white light, or in a combination of color light-emitting diodes to emit red, green and blue light.

The printed circuit board 33 may be a metal printed circuit board composed of a material such as silicon steel sheet, zinc steel sheet or aluminum sheet having high thermal conductivity, or a flexible printed circuit board (FPCB).

The printed circuit board 33 supplies a driving signal to the light-emitting diodes 31 and transfers heat generated from the light-emitting diodes 31 to the outside.

The light-emitting diodes 31 are mounted on such a printed circuit board 33 and arranged in a side lower part of the incident surface 26 of the light-guide portion 25. A light-emitting surface 32 to emit light may be positioned such that it irradiates light upward toward the front of the display device.

Meanwhile, in this exemplary embodiment, the light source unit 30 is provided under each of four sides of the light-guide portion 25 (i.e., a total number of light source units is 4). The light source unit 30 may be provided under opposite sides of the light-guide portion 25 (i.e., a total number of light source units is 2) or under one side of the light-guide portion 25 (i.e., a total number of light source units is 1).

The reflective portion 40 is positioned under the light-guide portion 25, to re-reflect light directed downward and supply the re-reflected light to the light-guide portion 25.

The reflective portion 40 may be made of a plastic material such as polyethylene terephthalate (PET) or polycarbonate (PC).

The bottom chassis 50 is provided as a tetragonal plate with a predetermined thickness and is positioned under the reflective portion 40. Such a bottom chassis 50 may be made of a thermally conductive metal material. The use of a thermally conductive metal material aims to emit heat generated from the light source unit 30 to the outside.

Although not shown in the drawings, the bottom chassis 50 may be provided at the rear surface with a screw hole for screw joining, a stud or the like, and with at least one circuit board to drive the liquid crystal display device according to one exemplary embodiment. That is, when the liquid crystal display device according to the present invention is applied to a broadcasting signal receiver (television), a power circuit board and a main circuit board on which required signal processing connectors and signal processing IC are mounted may be joined thereto by a screw. In addition, the driving portion 15 of the liquid crystal display panel may be fixed at the edge of the rear surface of the bottom chassis 50.

The side frame 70 may include a side wall 71 to surround an outside (or outer surface) of the light-guide portion 25, the backlight unit 20 and the bottom chassis 50. A support rib 74 extends from the side wall 71 to provide a space between the optical sheet 21 and the light-guide portion 25.

The side wall 71 constitutes the side periphery of the liquid crystal display device. The liquid crystal display panel 10 and the optical sheet 21 are mounted on the support rib 74, and the bottom of the support rib 74 may be supported by the top of the light-guide portion 25.

Figure 2:
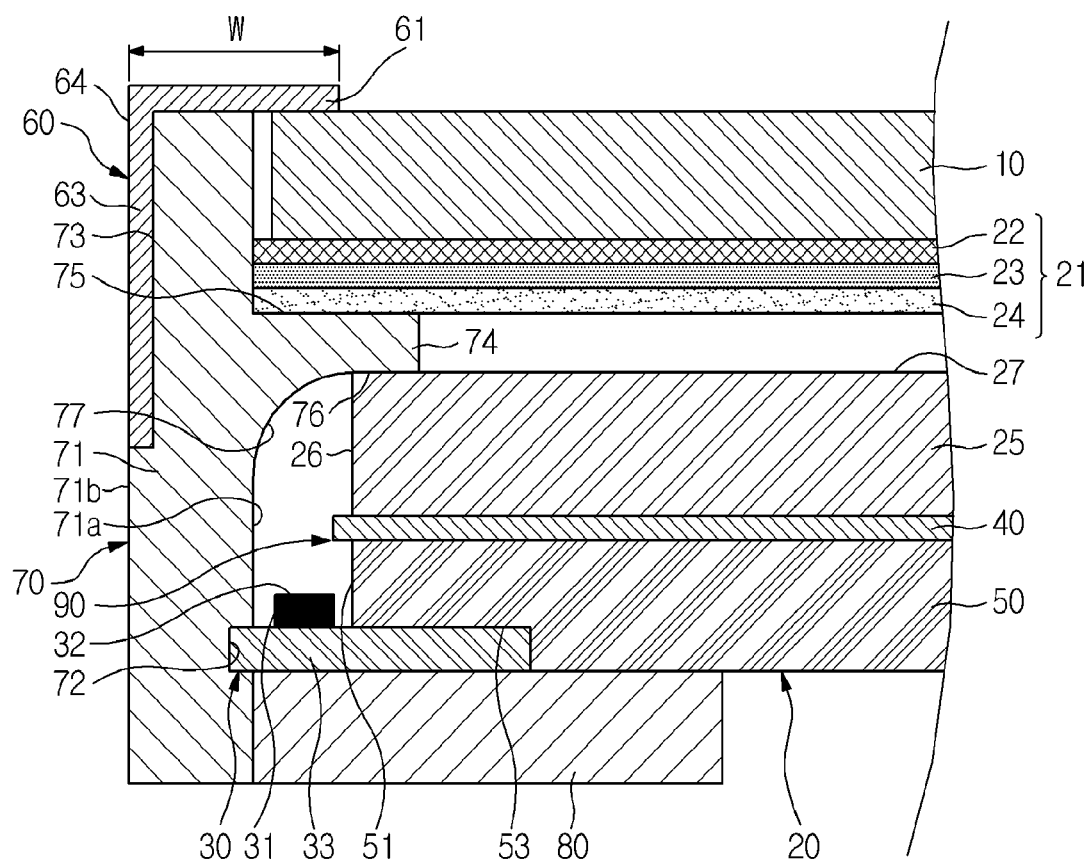
FIG. 2 is a sectional view illustrating an assembly structure of the liquid crystal display device according to one exemplary embodiment.

FIG. 2 is a sectional view illustrating the assembly structure of a liquid crystal display device according to one exemplary embodiment.

Referring to FIG. 2, the side frame 70 is provided with the side wall 71 to surround the outside of the liquid crystal display panel 10, the backlight unit 20 and the bottom chassis 50, and constitutes the side periphery of the liquid crystal display device.

A top side of the support rib 74 constitutes a mounting surface 75, on which the liquid crystal display panel 10 and the optical sheet 21 are mounted, and a bottom side of the support rib 74 constitutes a supporting surface 76 to support an upper edge of the light-guide portion 25.

Such a side frame 70 may be made of a resin material or a thermally conductive metal material. In this exemplary embodiment, the side frame 70 is made of a steel or aluminum material.

A light source unit 30 may be provided between an inner surface 71a of the side wall 71 and a side 51 of the bottom chassis 50.

The light source unit 30 may be positioned in a side lower part of the incident surface 26 of the light-guide portion 25 to prevent light from being directly emitted to the incident surface 26 of the light-guide portion 25.

For this purpose, one side of the printed circuit board 33 of the light source unit 30 is joined with the side frame 70, and another side of the PCB 33 is joined with the bottom chassis 50, and a plurality of light-emitting diodes 31 longitudinally spaced apart from one another are mounted on a top of the PCB 33 such that the light-emitting surface 32 directs light upward.

The side frame 70 may be provided at the inner surface 71a thereof with a mounting groove 72 shaped to enable one side of the printed circuit board 33 to be supported thereon, and the bottom chassis 50 is provided at the edge thereof with an accepting groove 53 grooved to enable the other side of the printed circuit board 33 to be accepted therein.

The one side of the printed circuit board 33 accepted in the accepting groove 53 may be fixed on the bottom chassis 50 through a mounting member 35 such as screws (see FIG. 1).

The side frame 70 may be joined to the bottom chassis 50 through a holder 80.

The holder 80 may be made of a highly thermally conductive metal material, steel or aluminum, which is the same material as the side frame 70 in this exemplary embodiment.

The holder 80 closely contacts the rear surface of the printed circuit board 33, with one side thereof connected with the side frame 70 through a connecting member 78 (see FIG. 1), and the other side thereof connected with the bottom chassis 50 through a connecting member 55 such as screws (see FIG. 1) in order to fasten the side frame 70 and the bottom chassis 50 with each other.

Such a holder 80 transfers heat generated from the light source unit 30 to the outside of the display device.

The liquid crystal display panel 10 mounted on the support rib 74 of the side frame 70 may be supported by the top chassis 60.

The top chassis 60 may include a bezel portion 61 to surround an upper-facing edge of the liquid crystal display panel 10 and a side portion 63 to surround a part of the side wall 71 of the side frame 70.

The side portion 63 of the side frame 70 is mounted on a recessed surface 73 through the connecting member 54 such as a screw (see FIG. 1); and the side portion 63 is formed from an outer surface 71b.

An outer surface 64 of the side portion 63 mounted on the recessed surface 73 may be substantially flush with the outer surface 71b of the side wall 71. This aims to reduce the width W of the bezel portion 61.

The side frame 70 may be provided on the inner surface 71a thereof with a reflective surface 77.

The reflective surface 77 faces the light-emitting surface 32 of the light-emitting diodes 31 to horizontally refract light so that light directed from the light-emitting surface 32 upward is irradiated to the incident surface 26 of the light-guide portion 25.

The reflective surface 77 may have a curved cross-section having a predetermined curvature or an inclined cross-section.

Such a reflective surface 77 may be integrated with the inner surface 71a of the side frame 70, when the side frame 70 is made of a metal such as steel or aluminum.

On the other hand, when the side frame 70 is made of a resin material, the reflective surface 77 may be coated with a metal sheet having a high reflectance such as silver or aluminum.

Based on this configuration, a sufficient light mixing length can be created between the light source unit 30 and the incident surface 26 of the light-guide portion 25.

The light mixing length means a length of passage of light required for shielding a hot-spot generated when a spot light source emitted from the light-emitting diodes 31 is incident on the incident surface 26 of the light-guide portion 25.

That is, light irradiated from the light-emitting surface 32 of the light-emitting diodes 31 upward is reflected from the reflective surface 77 and then irradiated to the incident surface 26 of the light-guide portion 25, thus creating a sufficient light mixing length from light emitting from the light-emitting diodes 31 to the light-guide portion 25.

This configuration enables the light mixing length required between the light-emitting diode 31 and the light-guide portion 25 to be created in a vertical orientation, thus reducing the width (W) of the light mixing length and in turn reducing the width of the bezel portion 61 required to cover the light mixing length.

As a result, the liquid crystal display device looks wider than an actual screen size due to decrease in width (W) of the bezel portion 61, thus improving aesthetic effects.

In addition, the liquid crystal display device is provided with the support rib 74 to mount the liquid crystal display panel 10 on the side frame 70 that constitutes the side circumstance of the liquid crystal display device, thus eliminating the necessity of any separate middle mold to support the liquid crystal display panel 10, and additionally enabling reduction of raw material costs and simplification of an assembly process.

Figure 3:
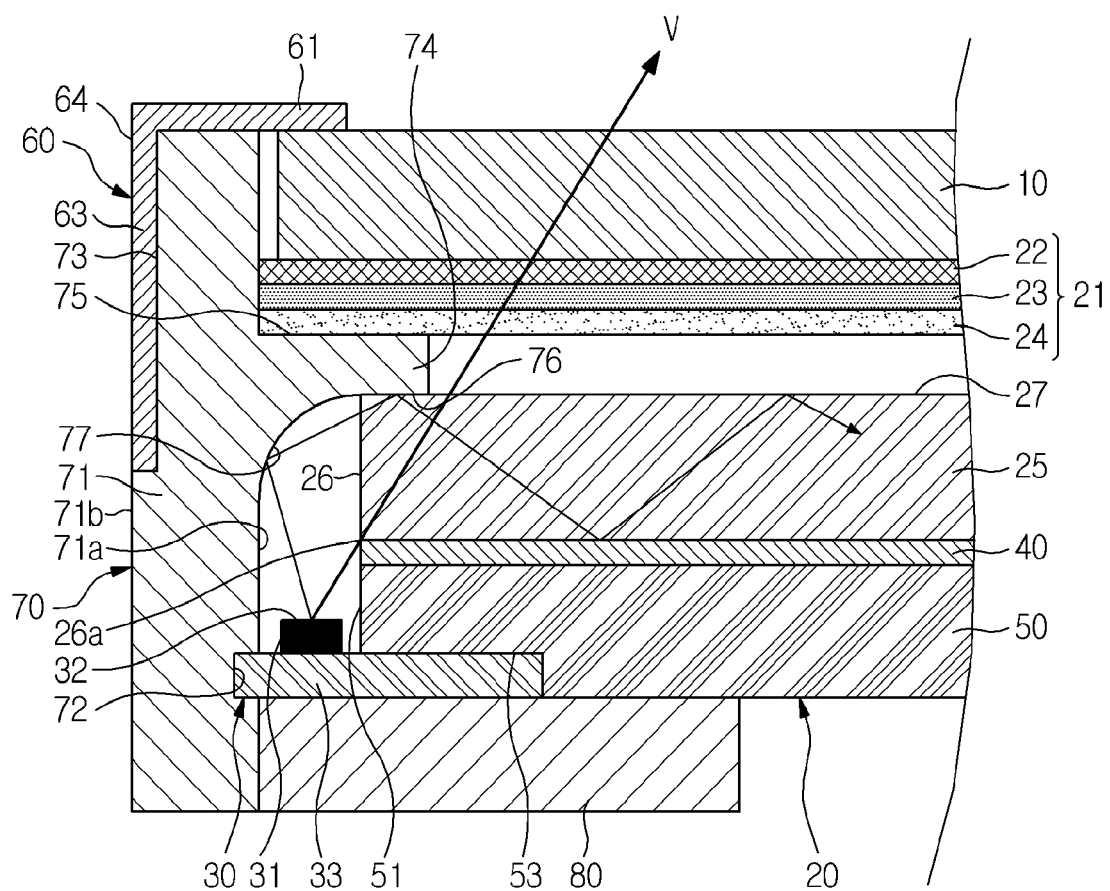
FIG. 3 is a sectional view illustrating light passage where a light-shielding member is not provided, according to one exemplary embodiment.

Meanwhile, as shown in FIG. 3, light emitted upward from the light-emitting diodes 31 arranged in a side lower part of the light-guide portion 25 is perpendicularly refracted by the reflective surface 77 and is directed through the incident surface 26 into the light-guide portion 25.

The light directed into the light-guide portion 25 is diffused through total reflection and is then supplied through the light-emitting surface 27 of the light-guide portion 25 to the liquid crystal display panel 10.

However, the light-emitting surface 32 of the light-emitting diodes 31 is positioned in a side lower part of the incident surface 26 of the light-guide portion 25, allowing a path of light (represented by the arrow "V") emitted from the light-emitting surface 32 to be incident to a lower edge 26a of the incident surface 26 of the light-guide portion 25.

The light incident to the lower edge 26a of the incident surface 26 is immediately emitted, since it does not satisfy total reflection conditions in the light-guide portion 25, and is thus shown in the form of a spot light source on the liquid crystal display panel 10.

Where a liquid crystal display device has a bezel portion 61 with a narrow width (W), as in the exemplary embodiments herein, the liquid crystal display device cannot be covered with the bezel portion 61, and reliability may be thus deteriorated.

In order to prevent these undesired results, the liquid crystal display device of this exemplary embodiment may be provided with a light-shielding member to prevent light irradiated upward from the light-emitting surface 32 of the light-emitting diodes 31 from being incident to the lower edge 26a of the incident surface 26 of the light-guide portion 25.

Figure 4:
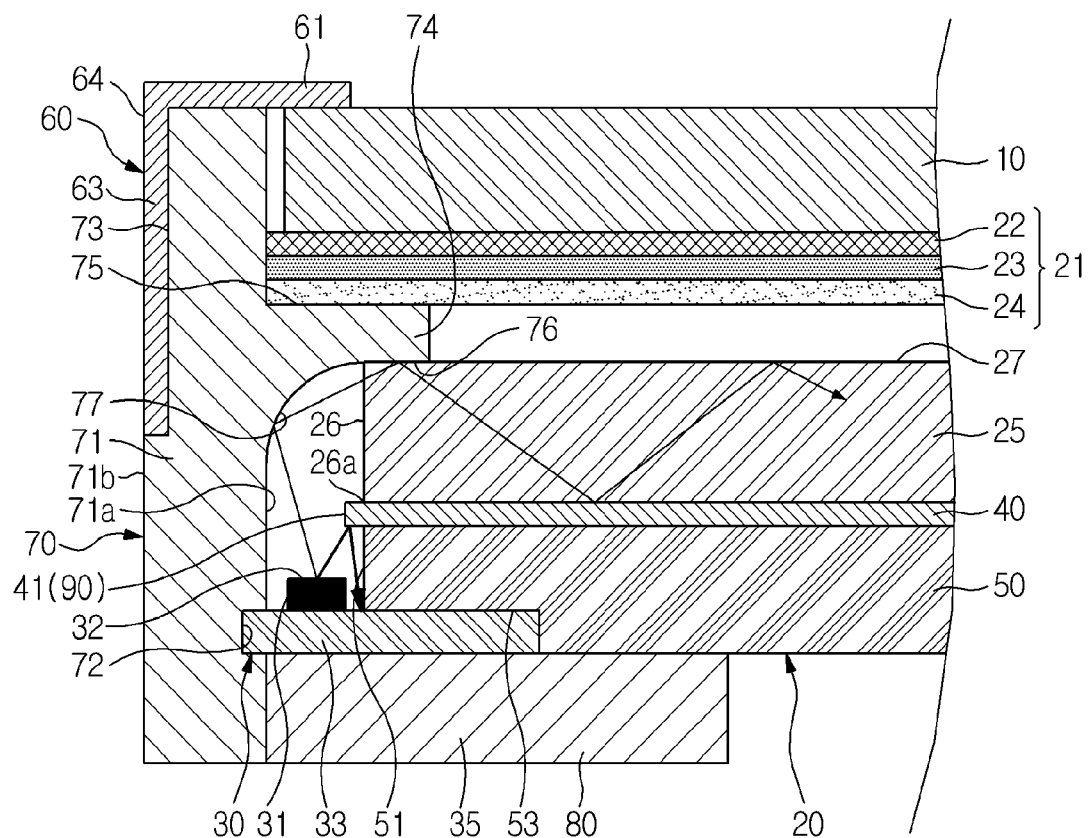
FIG. 4 illustrates light passage where a light-shielding member is provided, according to one exemplary embodiment.

As shown in FIG. 4, a light-shielding member 90 of this exemplary embodiment is provided to shield light incident to the lower edge 26a of the incident surface 26 of the light-guide portion 25 by using a reflective portion 40 positioned under the light-guide portion 25.

For this purpose, the reflective portion 40 is provided with a higher cross-sectional area than that of the light-guide portion 25, and is positioned under the light-guide portion 25.

That is, the edge of the reflective portion 40 positioned between the bottom chassis 50 and the light-guide portion 25 may be provided with an extending portion 41 which protrudes outward from the incident surface 26 of the light-guide portion 25.

The extending portion 41 reflects light emitted from the light-emitting diode which would otherwise be incident to the lower edge 26a of the incident surface 26, as shown by the arrow angled away from the extending portion 41 in FIG. 4. The extending portion 41 thus prevents light which does not satisfy the total reflection conditions from being directed into the light-guide portion 25.

The length of the extending portion 41 may be designed by taking into consideration thermal expansion of the light-guide portion 25. In this exemplary embodiment, taking into consideration factors such as light loss, the extending portion 41 may be provided to have a length of about 0.5 millimeters (mm).

Figure 5:
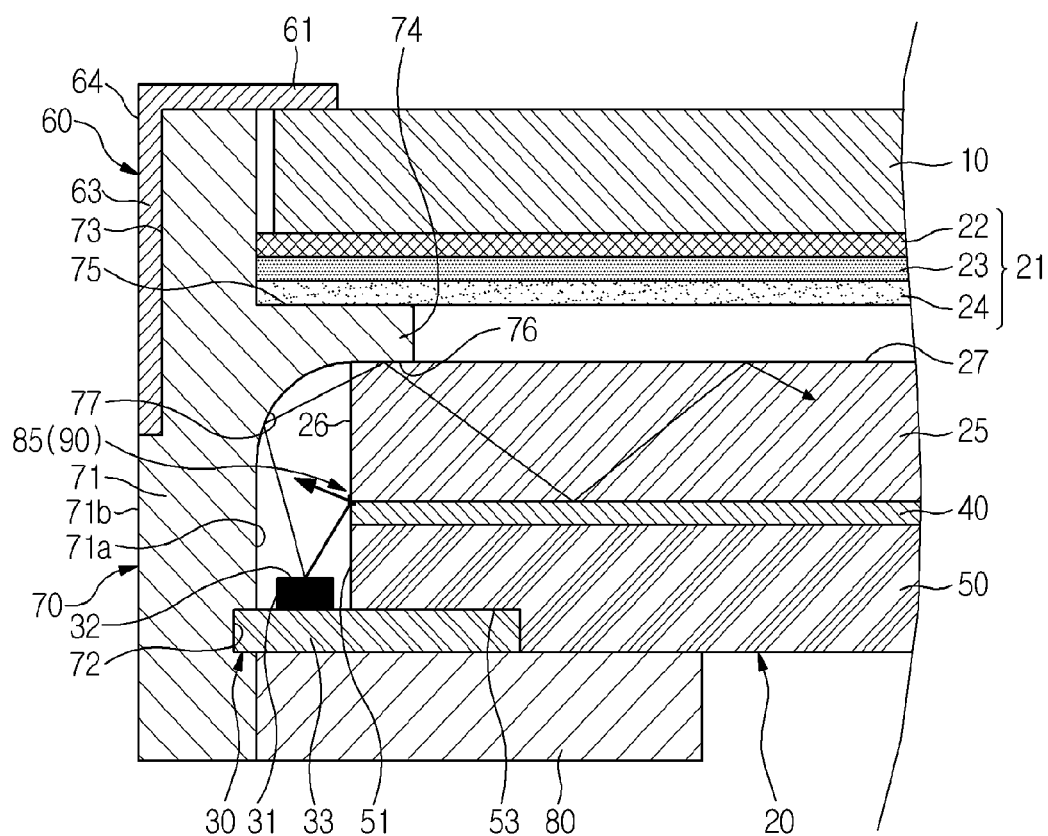
FIG. 5 illustrates a light-shielding member according to another exemplary embodiment.

In this exemplary embodiment, the light-shielding member 90 is realized by the extending portion 41 of the reflective portion 40. However, as shown in FIG. 5, an additional shielding film 85 may be adhered to the lower edge 26a to shield or absorb light incident around the lower edge 26a of the incident surface 26 of the light-guide portion 25. A material to reflect or absorb light may be adhered to the lower edge 26a or coated thereon.

Meanwhile, a path of light emitted from the light source unit 30 positioned in a side lower part of the incident surface 26 of the light-guide portion 25 is incident into a gap between the light-guide portion 25 and the reflective portion 40, or a gap between the support rib 74 and the light-guide portion 25 due to an assembly gap, thus causing a "hot spot," or bright line defect on the liquid crystal display panel 10.

Figure 6:
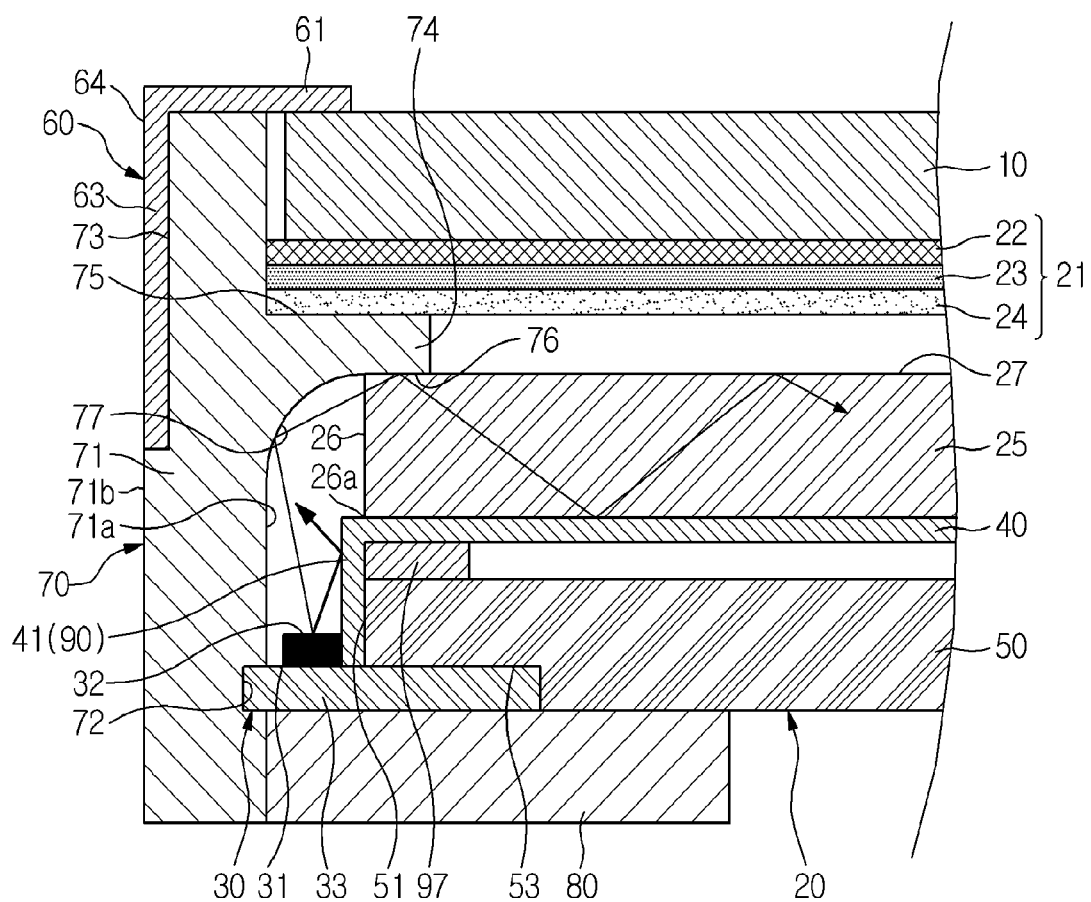
FIG. 6 illustrates a light-shielding member according to yet another exemplary embodiment.

In order to prevent this phenomena, as shown in FIG. 6, the extending portion 41 of the reflective portion 40 protrudes outward from the incident surface 26 of the light-guide portion 25 and is curved to surround a side 51 of the bottom chassis 50 positioned under the reflective portion 40.

The shape of this extending portion 41 increases reflection of light directed from the light-emitting diodes 31 to the side 51 of the bottom chassis 50, and thus improves the efficiency of the light source.

In addition, a pad 97 to press an end side of the light-guide portion 25 and the reflective portion 40 toward the support rib 74 of the side frame 70a may be provided between the reflective portion 40 and the bottom chassis 50.

The pad 97 may be made of an elastic material such as rubber and be positioned so that the curved extending portion 41 of the reflective portion 40 is curved around the pad 97 in order for the pad 97 to press the light-guide portion 25 and the reflective portion 40 upward in a direction of the liquid crystal display panel 10.

As a result, the pad 97 forces the reflective portion 40 and the light-guide portion 25 into close contact with each other, and the light-guide portion 25 and the support rib 74 into close contact with each other, thus removing a bright line defect ("hot spot") caused by light incident into a gap between the corresponding two members, thereby improving the quality of an image and the overall reliability of the liquid crystal display device.

Although a few exemplary embodiments have been shown and described, it will be appreciated by those skilled in the art that changes may be made in these exemplary embodiments without departing from the principles and spirit of the invention, the scope of which is defined in the claims and their equivalents.

What is claimed is:

1. A liquid crystal display device comprising:
a liquid crystal display panel;
a top chassis arranged on a front surface of the liquid crystal display panel;
a bottom chassis disposed behind a rear surface of the liquid crystal display panel;
at least one optical sheet arranged between the liquid crystal display panel and the bottom chassis;
a light-guide portion arranged between the bottom chassis and the optical sheet, the light-guide portion comprising a light-emitting surface facing the liquid crystal display panel and an incident surface perpendicular to the light-emitting surface;
a reflective portion arranged between the light-guide portion and the bottom chassis;
a side frame comprising a side wall to surround an outside of the light-guide portion, an outside of the reflective portion and an outside of the bottom chassis, and a support rib extending from the side wall to mount the liquid crystal display panel and the optical sheet;
a printed circuit board arranged between the side frame and the bottom chassis, the printed circuit board comprising a plurality of light-emitting diodes each having a light-emitting surface;
a reflective surface arranged in an inner surface of the side frame, the reflective surface directing light from the plurality of light-emitting diodes to the incident surface;
a holder to support one surface of the printed circuit board and connect the side frame with the bottom chassis; and
a light-shielding member disposed above the light-emitting surfaces of the light-emitting diodes, configured to prevent light irradiated from the light-emitting surfaces of the plurality of light-emitting diodes from being incident to a lower edge of the incident surface, wherein the light-shielding member is an extending portion protruding outward from an edge of the reflective portion so that the light-shielding member extends from a side surface of the light-guide portion.

2. The liquid crystal display device according to claim 1, wherein the extending portion has a length of about 0.5 millimeters (mm).

3. The liquid crystal display device according to claim 1, wherein the extending portion is curved to surround a side of the bottom chassis adjacent to the plurality of light-emitting diodes.

4. The liquid crystal display device according to claim 3, further comprising:
a pad providing close contact between the reflective portion and the light-guide portion, and providing close contact between the light-guide portion and the support rib.

5. The liquid crystal display device according to claim 4, wherein the pad is made of an elastic material.

6. The liquid crystal display device according to claim 1, wherein the side frame is made of a metal material.

7. The liquid crystal display device according to claim 6, wherein the reflective surface is curved with a predetermined curvature.

8. The liquid crystal display device according to claim 1, wherein the side frame is made of a resin material.

9. The liquid crystal display device according to claim 1, wherein the top chassis comprises a bezel portion to support an edge of the liquid crystal display panel, and a side portion extending from an end of the bezel portion at a different angle, and
wherein the side wall of the side frame is provided at the outer surface thereof with a recessed surface to mount the side portion.

10. The liquid crystal display device according to claim 1, wherein the holder is made of a thermally conductive metal material.

11. The liquid crystal display device according to claim 1, wherein the plurality of light-emitting diodes are mounted in the printed circuit board such that a light-emitting surface to emit light is directed upward in a direction of the liquid crystal display panel, and wherein the light-emitting surface is arranged below the reflective portion such that it is further from the liquid crystal display panel than the reflective portion.

12. The liquid crystal display device according to claim 1, wherein the bottom chassis is made of a thermally conductive material,
wherein the side frame is provided at the inner surface thereof with a mounting groove, and the bottom chassis is provided at the edge thereof with an accepting groove, and
wherein one side of the printed circuit board is mounted in the mounting groove and another side thereof is accepted in the accepting groove.

13. The liquid crystal display device according to claim 1, wherein the reflective surface is spaced away from the incident surface and faces the incident surface.

14. A liquid crystal display device comprising:
a liquid crystal display panel;
a light-guide portion arranged under the liquid crystal display panel;
a reflective portion arranged under the light-guide portion;
a plurality of light-emitting diodes arranged on at least one side of the light-guide portion, the plurality of light-emitting diodes mounted on a printed circuit board such that a light-emitting surface on each of the plurality of light-emitting diodes directs light toward the liquid crystal display panel, wherein light emitted from the light-emitting surface is refracted on a reflective surface arranged on the light-emitting surface and is incident to an incident surface provided on the side of the light-guide portion; and
a light-shielding member disposed under the light-guide portion and extending outward from a side surface of the light guide portion and disposed above the light-emitting surface of the light-emitting diodes, and configured to prevent light irradiated upward from the light-emitting surface of the light-emitting diodes from being incident to a lower edge of the incident surface of the light-guide portion.

15. The liquid crystal display device according to claim 14, further comprising a bottom chassis disposed under the light-guide portion so that the reflective portion is disposed between the light-guide portion and the reflective portion, wherein the light-shielding member is an extending portion protruding outward from an edge of the reflective portion, and wherein the extending portion extends outward from a side surface of the bottom chassis.

16. The liquid crystal display device according to claim 15, wherein the extending portion has a length of about 0.5 millimeters (mm).

17. The liquid crystal display device according to claim 15, further comprising a side frame provided with a side wall forming a side periphery of the liquid crystal display device, a support rib extending from the side wall to enable the liquid crystal display panel to be mounted thereon and to support the light-guide portion thereby, and a reflective surface at an inner surface thereof.

18. The liquid crystal display device according to claim 17, further comprising a rectangular bottom chassis arranged under the reflective portion,
wherein the plurality of light-emitting diodes are arranged between the side wall and a side of the bottom chassis, and wherein the extending portion is curved to surround the side of the bottom chassis.

19. The liquid crystal display device according to claim 18, further comprising:
a pad providing close contact between the support rib and the light-guide portion, and providing close contact between the light-guide portion and the reflective portion.

20. The liquid crystal display device according to claim 19, wherein the pad is made of an elastic material.

21. The liquid crystal display device according to claim 18, wherein the light-emitting surface of the light-guide portion is arranged below the reflective portion such that it is further from the liquid crystal display panel than the reflective portion.

22. The liquid crystal display device according to claim 18, further comprising:
a holder which supports one surface of the printed circuit board and connects the side frame with the bottom chassis, the holder being made of a thermally conductive metal material.

23. The liquid crystal display device according to claim 18, further comprising:
a top chassis comprising a bezel portion to support an edge of the liquid crystal display panel, and a side portion connected with the side wall of the side frame,
wherein the side wall comprises a recessed external surface to enable the side portion to be mounted thereon.

24. A liquid crystal display device comprising:
a liquid crystal display panel;
a light-guide portion positioned below the liquid crystal display panel and including a light-emitting surface facing the liquid crystal display panel and an incident surface perpendicular to the light-emitting surface;
a printed circuit board comprising a plurality of light-emitting diodes arranged on a periphery thereof, each having a light-emitting surface;
a side frame surrounding side surfaces of each of the liquid crystal display panel, light-guide portion and the printed circuit board, the side frame comprising an inner wall surface reflecting light from the plurality of light-emitting diodes to the light-emitting surface; and
a light-shielding member disposed above the light-emitting surfaces of the light-emitting diodes, and positioned between the plurality of light-emitting diodes and incident surface preventing light from directly irradiating from the plurality of light-emitting diodes to a lower edge of the incident surface, wherein the light-shielding member is an extending portion protruding outward from an edge of a reflective portion so that the light-shielding member extends from a side surface of the light-guide portion.

* * * * *